USO08089464B2

United States Patent
Wang et al.

(10) Patent No.: US 8,089,464 B2
(45) Date of Patent: Jan. 3, 2012

(54) COMPUTER MOUSE

(75) Inventors: Jin-Xin Wang, Shenzhen (CN);
Lian-Cheng Huang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 408 days.

(21) Appl. No.: 12/507,928

(22) Filed: Jul. 23, 2009

(65) Prior Publication Data
US 2010/0259878 A1    Oct. 14, 2010

(30) Foreign Application Priority Data

Apr. 13, 2009   (CN) .......................... 2009 1 0301534

(51) Int. Cl.
*G09G 5/08*  (2006.01)
(52) U.S. Cl. ........... 345/163; 463/37; 345/156; D14/402
(58) Field of Classification Search .................. 345/156, 345/163, 169; 463/37, 38; D14/402–410
See application file for complete search history.

(56) References Cited

U.S. PATENT DOCUMENTS

| 6,292,980 | B1 * | 9/2001 | Yi et al. ........................... 16/303 |
| 6,304,249 | B1 * | 10/2001 | Derocher et al. ............. 345/163 |
| 6,766,180 | B2 * | 7/2004 | Doraiswamy et al. ..... 455/575.1 |
| 7,379,051 | B2 * | 5/2008 | Yin et al. ....................... 345/163 |
| 7,525,533 | B2 * | 4/2009 | Shibuya et al. ............... 345/163 |
| 7,912,523 | B2 * | 3/2011 | Anand et al. ............... 455/575.3 |
| 7,986,522 | B2 * | 7/2011 | Zaitsu ...................... 361/679.55 |
| 2002/0158837 | A1 * | 10/2002 | Hou ............................. 345/156 |
| 2005/0116934 | A1 * | 6/2005 | Yin et al. ..................... 345/163 |
| 2010/0053084 | A1 * | 3/2010 | Chatterjee et al. ............ 345/163 |

* cited by examiner

*Primary Examiner* — Lun-Yi Lao
*Assistant Examiner* — Tom Sheng
(74) *Attorney, Agent, or Firm* — Altis Law Group, Inc.

(57) ABSTRACT

A collapsible computer mouse includes a main cover, a collapsible portion, and a hinge assembly hinging the main cover and the collapsible portion. The hinge assembly includes a first bracket, a second bracket, a restricting member, at least one resilient member, a fastener, a third bracket, and a connecting member. The first bracket, the second bracket, the restricting member, the resilient member, and the fastener are sleeved on the shaft. A protrusion is formed on of the first bracket or the restricting member, and a sliding slot is defined in the other. Elastic force created by the resilient member engages the protrusion in the sliding slot, such that the hinge assembly is self-locking.

19 Claims, 4 Drawing Sheets

COMPUTER MOUSE

BACKGROUND

1. Technical Field

The present disclosure generally relates to computer pointing devices, particularly, to a collapsible computer mouse.

2. Description of Related Art

A computer mouse is a standard input device of a computer. For convenient transport, a computer mouse may be designed very small. However, a computer mouse usually matches the shape of a user's hand. If the computer mouse is manufactured too small, using the mouse can be uncomfortable. Therefore, a collapsible computer mouse has been designed.

A typical collapsible computer mouse includes a main body hinged on a supporting portion. The main body defines a recessed portion. The supporting portion can hinge on the main body via the hinge mechanism, and be received in the recessed portion. The hinge mechanism includes a base plate and a bar. The base plate defines a sliding slot in which the bar is slidable and fixable at any position along the slot. The bar can expand the main body and the supporting portion. However, there is a constant force must be maintained when collapsing or expanding the mouse. Therefore, such operation is not convenient.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
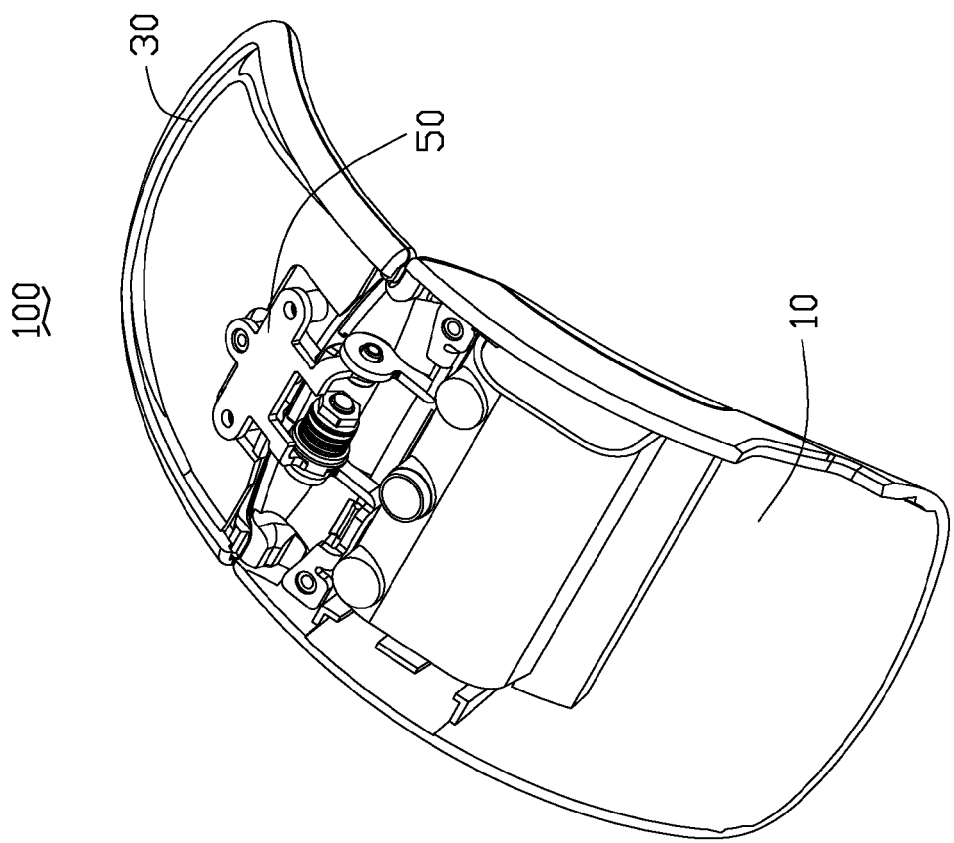
FIG. 1 is a partial, assembled, isometric view of an embodiment of a collapsible computer mouse including an embodiment of a hinge assembly.

Referring to FIG. 1, an embodiment of a collapsible computer mouse 100 includes a main cover 10, a collapsible portion 30, and a hinge assembly 50 to hinge the main cover 10 on the collapsible portion 30.

Figure 2:
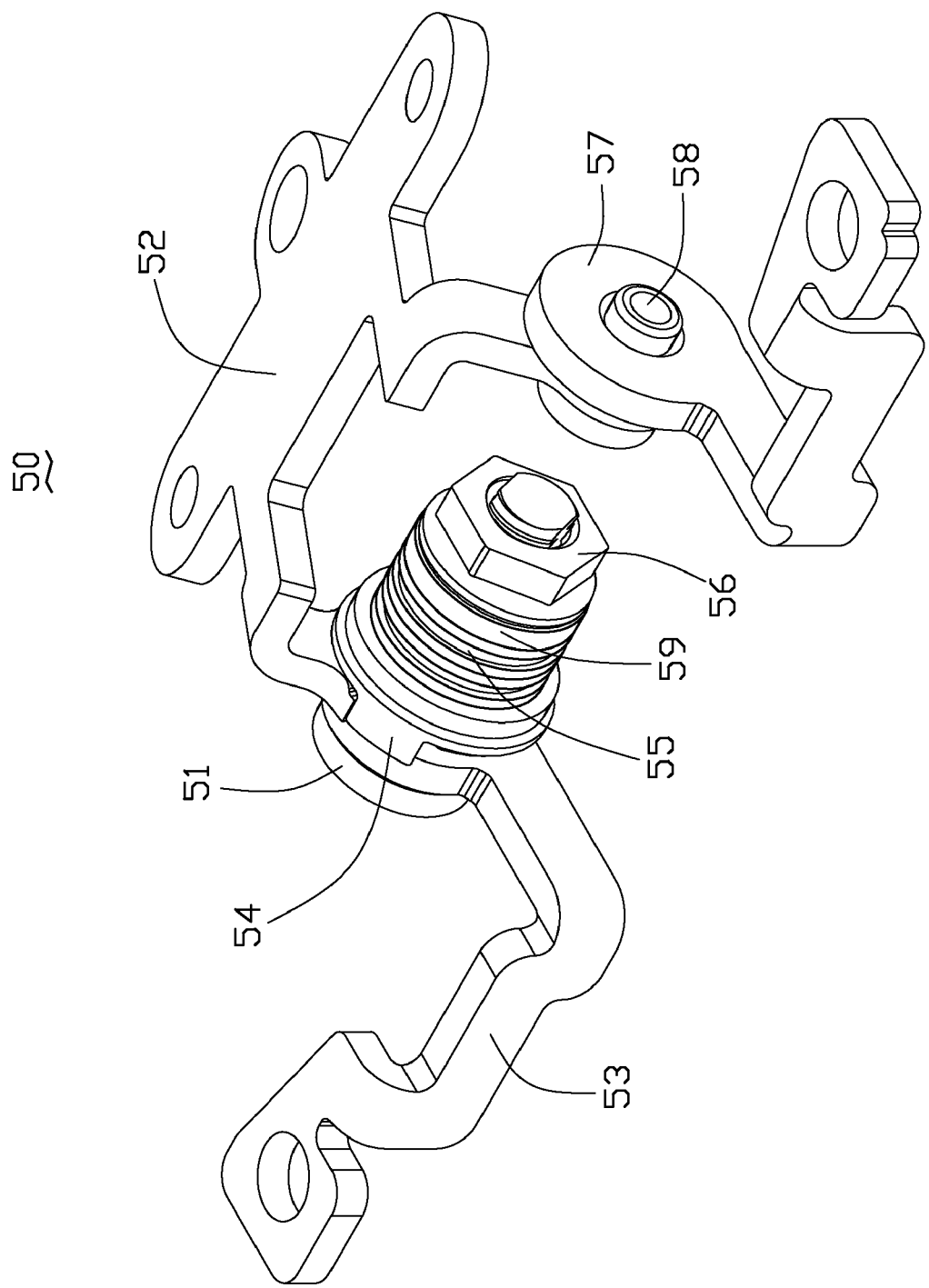
FIG. 2 is an assembled, isometric view of the hinge assembly of FIG. 1, the hinge assembly including a first bracket.

Referring to FIG. 1 and FIG. 2, the hinge assembly 50 includes a shaft 51, a first bracket 52, a second bracket 53, a restricting member 54, at least one resilient member 55, a fastener 56, a third bracket 57, and a connecting member 58. The first bracket 52 connects with the collapsible portion 30, and the second and third bracket 53, 57 connect with the main cover 10. The first bracket 52, the second bracket 53, the restricting member 54, the resilient member 55, and the fastener 56 sleeve on the shaft 51. The connecting member 58 connects the first bracket 52 and the third bracket 57.

Figure 3:
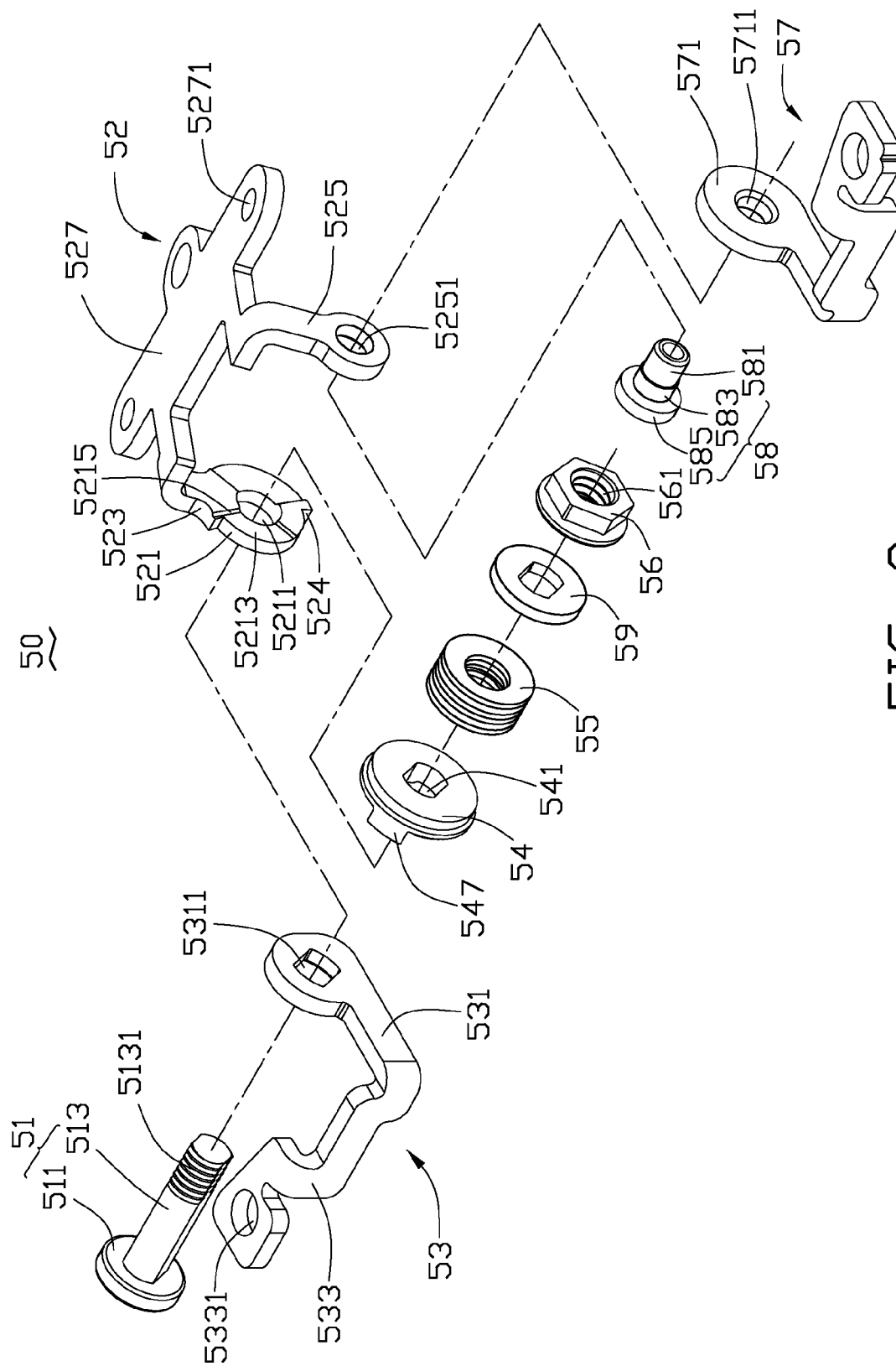
FIG. 3 is an exploded, isometric view of the hinge assembly in FIG. 2.

Referring to FIG. 2 and FIG. 3, the shaft 51 includes a flange 511 and a shaft portion 513. The flange 511 is formed on a proximal end of the shaft portion 513. The shaft portion 513 has a non-circular cross-section. A threaded portion 5131 may be formed on a distal end of the shaft portion 513.

The first bracket 52 includes a positioning end 521, a first restricting portion 523 and a second restricting portion 524 formed at the edge of the positioning end 521, a connecting wall 525 opposite to the positioning end 521, and a fixing plate 527 connecting the positioning end 521 with the connecting wall 525.

The positioning end 521 defines a circular pivot hole 5211 and two sliding slots 5213 on opposite ends. Each end of each sliding slot 5213 forms a first sloping surface 5215. The first restricting portion 523 extends from the edge of one sliding slot 5213, and the second restricting portion 524 extends from the edge between the two sliding slots 5213. The angle between the first restricting portion 523 and the second restricting portion 524 is determined by a desired rotating angle of the collapsible portion 30. The connecting wall 525 defines a circular hole 5251. The fixing plate 527 defines a plurality of assembly holes 5271 to connect with the main cover 10 of the collapsible computer mouse 100.

The second bracket includes a side plate 531 and a fixing portion 533. The side plate 531 defines a non-circular hole 5311 for receiving the shaft portion 513 of the shaft 51. The fixing portion 533 defines an assembly hole 5331 to connect with the collapsible portion 30 of the collapsible computer mouse 100.

Figure 4:
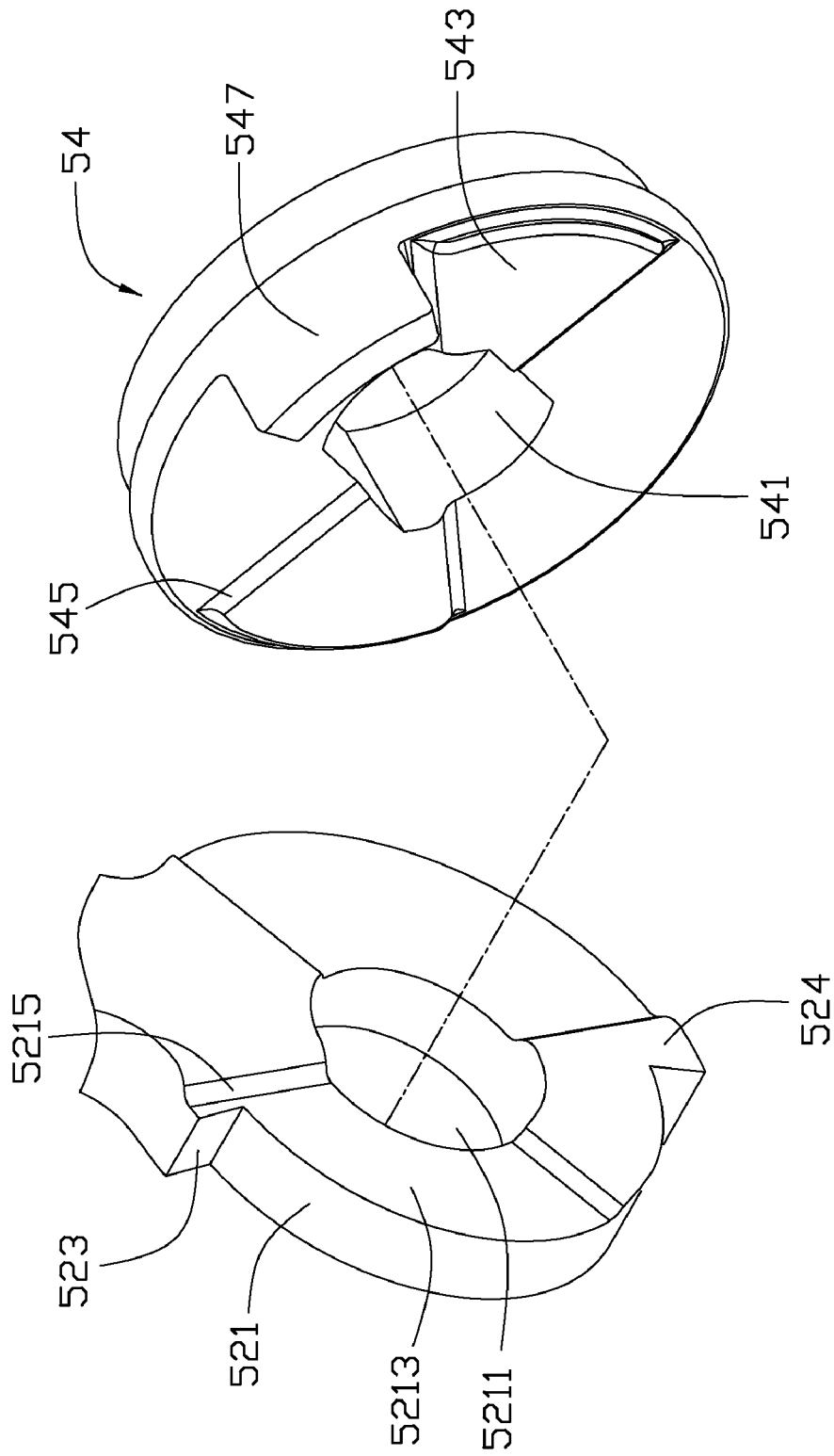
FIG. 4 is an exploded, isometric view of a restricting member and part of a first bracket in FIG. 3.

Referring to FIG. 3 and FIG. 4, the restricting member 54 is the same size as the positioning end 521. The restricting member 54 defines a non-circular engaging hole 541 in a center, two opposite protrusions 543 at an end surface, and a second sloping surface 545 at the opposite ends of each protrusion 543. A restricting piece 547 extends from an edge of the restricting member 54. The protrusion 543 is smaller than the sliding groove 5213, so that the protrusion 543 can slide in the sliding groove 5213 a predetermined distance.

The resilient member 55 is elastic and sleeved on the shaft portion 513 of the shaft 51. There are four resilient members 55 in the illustrated embodiment.

The fastener 56 defines a fastening hole 561 that engages with the threaded portion 5131 of the shaft 51.

Referring to FIG. 2 and FIG. 3, the third bracket 57 is fixed with the main cover 10 of the collapsible computer mouse 100. The third bracket 57 includes a connecting plate 571. The connecting plate 571 defines a connecting hole 5711 opposite to the circular hole 5251 of the connecting wall 525.

The connecting member 58 includes a first shaft section 581, a second shaft section 583, and a third shaft section 585 arranged in order. A diameter of the first shaft section 581 is less than a diameter of the second shaft section 583, but larger than a diameter of the connecting hole 5711 of the connecting plate 571. The diameter of the second shaft section 583 is smaller than a diameter of the third shaft section 585 and a diameter of the circular hole 5251 of the first bracket 52. The diameter of the third shaft section 585 is larger than the diameter of the circular hole 5251 of the first bracket 52.

In addition, the hinge assembly 50 may further include a washer 59 arranged between the resilient member 55 and the fastener 56 to prevent wear of the resilient member 55.

Referring to FIG. 1, FIG. 3, and FIG. 4, during assembly of the collapsible computer mouse 100, the first bracket 52 is fixed to the collapsible portion 30, and the second and third bracket 53, 57 are fixed to the main cover 10. The shaft portion 513 of the shaft 51 extends through the non-circular hole 5311 of the second bracket 53, the pivot hole 5211 of the first bracket 52, the engaging hole 541 of the restricting member 54, the resilient 55 and the washer 59. The fastener 56 engages the threaded portion 5131 of the shaft 51, so that the members sleeved on the shaft portion 513 are retained along the shaft portion 513. The first shaft section 581 of the connecting member 58 extends through the circular hole 5251 of the first bracket 52 and the connecting hole 5711 of the third bracket 57. The first shaft section 581 and the third bracket 57 fit by interference because the first shaft section 581, the connecting hole 5711 of the third bracket 57, the second shaft section 583, and the circular hole 5251 of the first bracket 52 have different diameters. Therefore, the first bracket 52 can rotate around the connecting member 58, and the third shaft section 585 can restrict the first bracket 52.

When the collapsible computer mouse 100 is collapsed or expanded, each protrusion 543 of the restricting member 54 is received in one sliding slot 5213 of the first bracket 52. When the collapsible portion hinges on the main cover 10, each protrusion 543 slides out from one corresponding sliding slot 5213 and into the other sliding slot 5213. In the sliding process, the resilient member 55 is compressed. When the protrusion 543 slides outside of the sliding slot 5213 completely, the elastic restoring force of the resilient member 55 urges the protrusion 543 to slide into the other sliding slot 5213 along the first sloping surface 5215 of the first bracket 52. Thus, the hinge assembly 50 is self-locking. When the collapsible computer mouse 100 is collapsed, the protrusion 543 can slide in the sliding groove 5213 a predetermined distance because the protrusion 543 is smaller than the sliding groove 5213. The restricting piece 547 of the restricting member 54 resists the second restricting portion 524 of the first bracket 52, to prevent the protrusion 543 from sliding out of the sliding slot 5213. When the collapsible computer mouse 100 is expanded, the restricting piece 547 of the restricting member 54 resists the first restricting portion 523 of the first bracket 52, thereby preventing the protrusion 543 from sliding into the sliding slot 5213.

The collapsible computer mouse 100 can achieve this self-locking feature during collapsing or expansion by the engagement of the protrusion 543 of the restricting member 54 and the sliding slot 5213 of the first bracket 52. A force is only required on the collapsible computer mouse 100 at the initial collapse or expansion to hinge the collapsible portion 30 on the main cover 10. In the following process, the protrusion 543 can automatically slide into the sliding slot 5213, urged by the elastic force created by the resilient member 55. When the collapsible computer mouse 100 is collapsed, the protrusion 543 can slide in the sliding slot 5213 along a circumferential direction, thereby preventing the main cover 10 and the collapsible portion 30 from colliding, thus protecting the collapsible computer mouse 100 from damage and allowing a long lifespan.

In an alternative embodiment, the protrusion 543 may be formed at the first bracket 52, and accordingly, the sliding slot 5213 may be defined in the restricting member 54.

The second bracket 53 may also be omitted, and the shaft 51 fixed directly to the main cover 10.

In addition, the third bracket 57 and the connecting member 58 may be omitted. The connecting wall 525 of the first bracket 52 would then be omitted.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A computer mouse, comprising:
a main cover;
a collapsible portion; and
a hinge assembly hinging the main cover on the collapsible portion, the hinge assembly comprising:
a first bracket connecting with the collapsible portion;
a shaft extending through the first bracket;
a restricting member sleeved on the shaft; and
at least one resilient member sleeved on the shaft;
wherein a protrusion is formed at one of the first bracket and the restricting member, and a sliding slot is defined in the other one of the first bracket and the restricting member, wherein elastic force created by the at least one resilient member urges the protrusion in the sliding slot, such that the hinge assembly is self-locking.

2. The computer mouse of claim 1, wherein the hinge assembly further comprises a second bracket fixed with the main cover, through which the shaft extends.

3. The computer mouse of claim 2, wherein the shaft comprises a shaft portion, a flange formed on an end of the shaft portion, and a threaded portion formed on the other end of the shaft portion.

4. The computer mouse of claim 3, wherein the hinge assembly further comprises a fastener engaging with the thread portion of the shaft.

5. The computer mouse of claim 2, wherein the hinge assembly further comprises a third bracket fixed with the main cover; and the third bracket rotatably connects to the first bracket.

6. The computer mouse of claim 5, wherein the hinge assembly further comprises a connecting member connecting the first bracket with the third bracket; the connecting member comprises a first shaft section and a second shaft section; the first bracket rotatably sleeves on the second shaft section; and the third bracket is fixed to the first shaft section.

7. The computer mouse of claim 1, wherein the first bracket comprises a positioning end forming a restricting portion, and the restricting member forms a restricting piece engaging with the restricting portion to restrict the rotating angle of the restricting member.

8. The computer mouse of claim 7, wherein the restricting member is substantially the same size as the positioning end; the protrusion along the rotation direction is shorter than the sliding slot, so that the protrusion is slidable in the sliding slot.

9. The computer mouse of claim 1, wherein the resilient member is elastic.

10. The computer mouse of claim 1, wherein the restricting member defines a non-circular engaging hole; the shaft has a non-circular cross-section; and the restricting member non-rotatably sleeves on the shaft.

11. A computer mouse, comprising:
a main cover;
a collapsible portion; and
a hinge assembly hinging the main cover on the collapsible portion, the hinge assembly comprising:
a first bracket connecting with the collapsible portion;
a shaft extending through the first bracket;
a restricting member sleeved on the shaft; and
at least one resilient member sleeved on the shaft;
wherein a sloping surface is formed at the first bracket, a protrusion is formed at the restricting member, and elastic force created by the at least one resilient member automatically slides the protrusion along the sloping surface.

12. The computer mouse of claim 11, wherein the restricting member defines a non-circular engaging hole; the shaft has a non-circular cross-section; and the restricting member non-rotatably sleeves on the shaft.

13. The computer mouse of claim 12, wherein the hinge assembly further comprises a second bracket fixed with the main cover; and the shaft extends through the second bracket.

14. The computer mouse of claim 13, wherein the shaft comprises a shaft portion, a flange formed on an end of the shaft portion, and a threaded portion formed on the other end of the shaft portion.

15. The computer mouse of claim 14, wherein the hinge assembly further comprises a fastener engaging with the thread portion of the shaft.

16. The computer mouse of claim 12, wherein the first bracket forms a restricting portion; and the restricting member forms a restricting piece engaging with the restricting portion to restrict the rotating angle of the restricting member.

17. The computer mouse of claim 12, wherein the hinge assembly further comprises a third bracket fixed with the main cover; and the third bracket rotatably connects to the first bracket.

18. The computer mouse of claim 17, wherein the hinge assembly further comprises a connecting member connecting the first bracket with the third bracket; the connecting member comprises a first shaft section and a second shaft section; the first bracket rotatably sleeves on the second shaft section; and the third bracket is fixed to the first shaft section.

19. The computer mouse of claim 11, wherein the resilient member is elastic.

* * * * *